Oct. 25, 1932.  H. F. PITCAIRN ET AL  1,884,849
AIRCRAFT
Filed Dec. 21, 1929   2 Sheets-Sheet 1
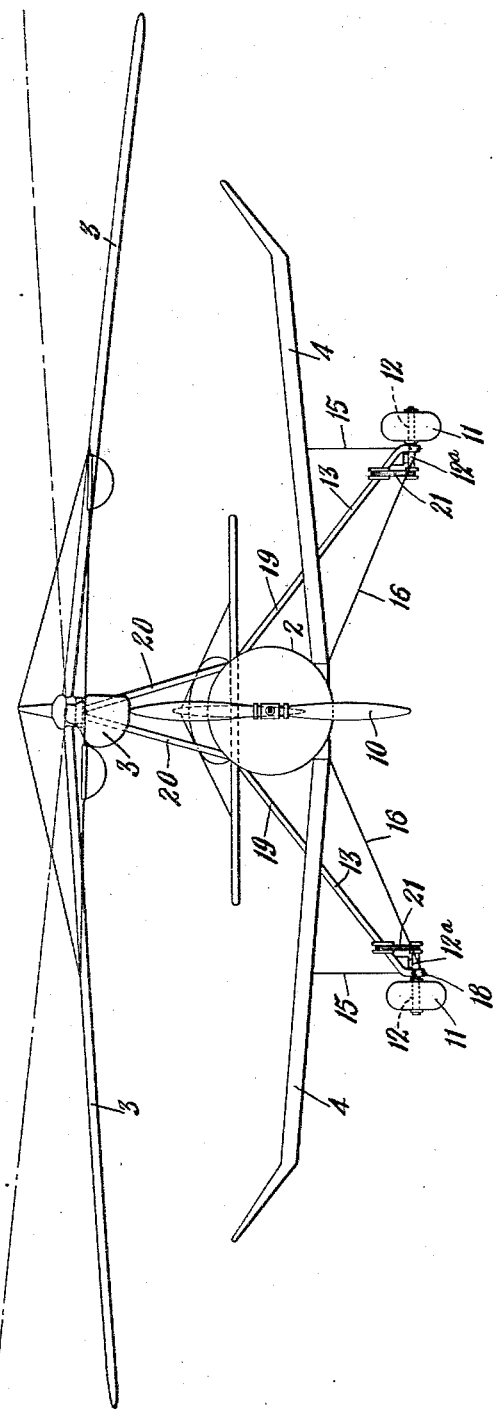
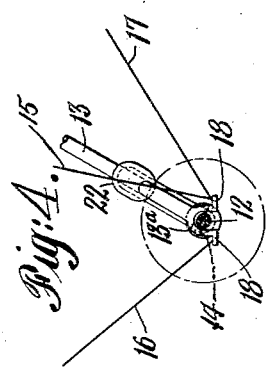
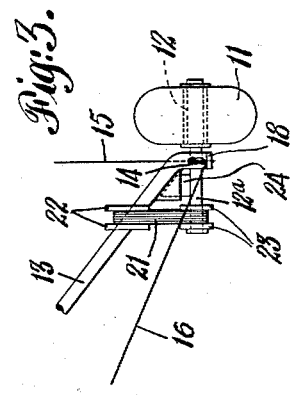
INVENTORS
Harold F. Pitcairn +
Juan de la Cierva
BY
Synnestvedt + Lechner
ATTORNEYS Patented Oct. 25, 1932

1,884,849

UNITED STATES PATENT OFFICE

HAROLD F. PITCAIRN, OF BRYN ATHYN, PENNSYLVANIA, AND JUAN DE LA CIERVA, OF MADRID, SPAIN, ASSIGNORS TO AUTOGIRO COMPANY OF AMERICA, OF PHILADELPHIA, PENNSYLVANIA, A CORPORATION OF DELAWARE

AIRCRAFT

Application filed December 21, 1929. Serial No. 415,684.

This invention relates to aircraft, and more particularly to landing gear therefor which is especially adapted to aircraft capable of slow vertical descent, such as aircraft having rotative wings or sustaining blades driven by the relative air-flow in flight.

In aircraft of the character above-mentioned, when making a vertical or nearly vertical descent, although the center of lift of the rotating system of blades is high enough to ensure a landing with the ship on a substantially even keel, yet, if there be little or no forward movement of the machine and substantially no wind blowing, the ordinary directional control surfaces of the aircraft may not have sufficient translational movement with respect to the atmosphere to permit of their being fully effective in preventing side-slipping or other movements when landing. For this reason, it is desirable to have a landing gear, particularly on such aircraft, which shall be capable of sustaining considerable lateral strains.

It is therefore one of the primary objects of our invention to provide adequate means for supporting an aircraft in landing, even in approximately vertical descent, which shall also be capable of sustaining considerable lateral and other strains and forces without damage to it or to the aircraft.

More specifically it is an object of the invention to provide a landing gear or undercarriage mechanism which, though simple, and relatively light in weight, shall be of rugged construction and well adapted to use on aircraft of the type hereinbefore described.

Other objects of the invention involve the provision of an extra wide undercarriage, to give a good basis for vertical descent and to prevent overturning of the aircraft; to utilize the auxiliary, or fixed wings of an auto-rotative-wing-supported aircraft for bracing and supporting the undercarriage; to provide rigid thrust means for carrying side strains through said fixed wings and upwardly to the fuselage or other part of the aircraft; and in combination with the foregoing, to provide relatively light tension means for transmission of landing strains directly from the landing gear to the fuselage, and to support the landing gear from the fixed wings, when in flight.

The invention further contemplates various advantageous details of construction and operation hereinafter to be set forth.

How the foregoing objects and advantages are attained, together with such others as are incident to the invention or will occur to those skilled in the art, will be clear from the following description, taken together with the accompanying drawings, in which drawings:

Fig. 1 is a front elevational view of an aircraft of the type described, embodying our improvements;

Fig. 3 is an enlarged detailed view of a portion of the structure shown in Fig. 1; and Fig. 4 is an elevational view from the right of Fig. 3, with the wheel omitted and its spindle shown in section.

Figure 2:
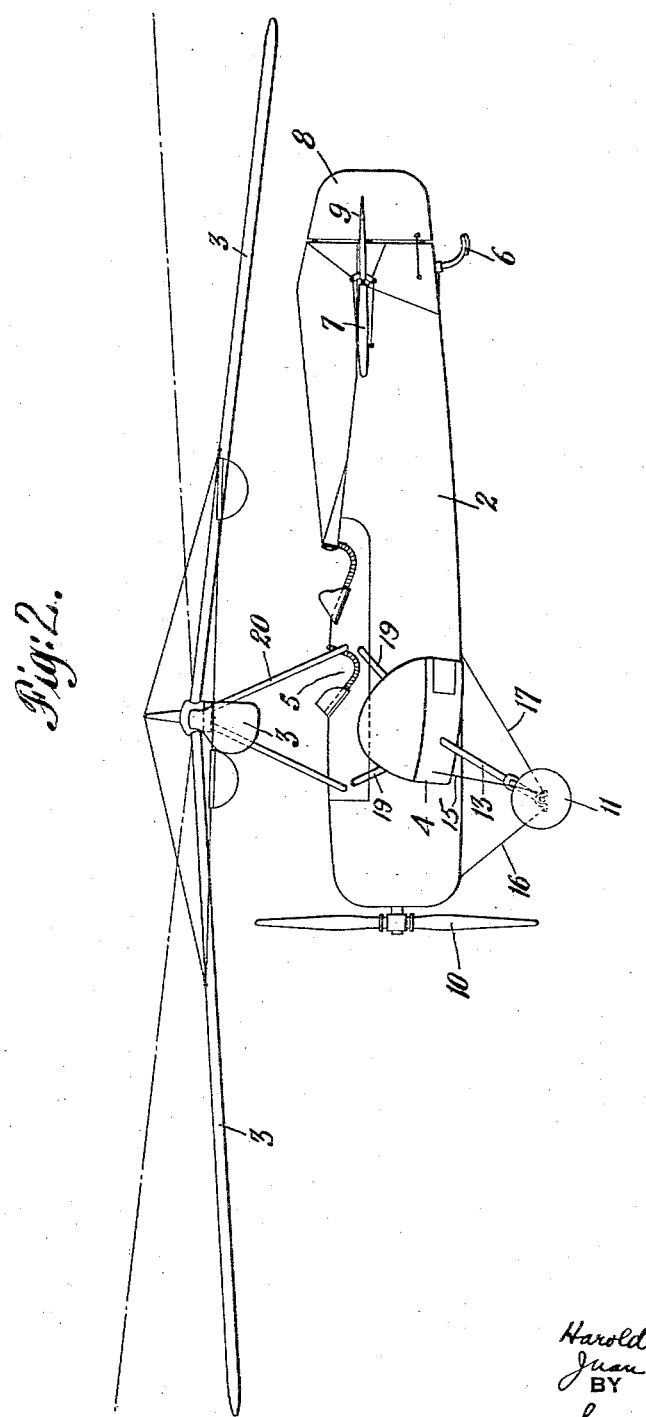
Fig. 2 is a side elevation of the same.

By reference first to Figs. 1 and 2, it will be seen that we have illustrated an aircraft having a fuselage 2, auto-rotative or wind-driven wings or blades 3, mounted above the fuselage for rotation under the influence of the relative air-flow in flight, auxiliary or fixed wings 4, mounted on the fuselage beneath the rotative sustaining system, the usual cock-pit 5, tail skid 6, lateral, directional and vertical control surfaces 7, 8 and 9, and power-driven propeller 10 for effecting translational movement of the machine. The specific structure of the fixed wings shown herein, and certain relationships thereof to the rotary wings, are fully disclosed and claimed in the copending application of Juan de la Cierva, Serial No. 414,901, filed December 18, 1929.

According to the preferred embodiment of the present invention, the undercarriage comprises a pair of resilient or flexible wheels (for example, wheels made of pneumatic rubber tires formed in wheel shape) indicated by the numerals 11, 11, which are very widely spaced apart as shown in Fig. 1, and which are positioned about at the leading edge of the fixed wings, so as to be in advance of the normal center of gravity of the machine as a whole. Each wheel 11 may be mounted on a spindle 12 rigidly fixed on the compression strut 13, or, as here shown, pivotally mounted on said strut by the bolt or pivot 14 (see Figs. 3 and 4), the arrangement shown being preferable for aircraft having anything but the lowest vertical landing speed, the rigid strut 13 extending inwardly and upwardly to a juncture with the fixed wing, preferably at such a flat angle with relation to the surface of the ground, that any lateral compression strain will be carried upward through the strut, without imposing such strain upon the tension wire or cable 15, the latter being positioned outside of or beyond the compression means and being provided to sustain the weight of the wheel when in flight.

Normal vertical thrusts in the landing gear, when effecting a landing, are taken by the compression strut 13, and the fore and aft tension wires or cables 16, 17, which are connected at their upper ends to the lower longerons of the fuselage 2 and at their lower ends to the ears 18 on the compression strut 13. The system further involves upper compression struts 19 which extend from the fixed wings, approximately at the point where the lower compression struts are attached thereto, to the upper part of the fuselage, preferably to the upper longerons adjacent the base of the pylon legs or struts 20, which support the rotor and take the lift of the machine in flight. These struts 19, therefore, obviously serve not only as a means of transmitting landing strains to the fuselage, but also for interbracing the fixed wings, the rotor pylon and the fuselage and supporting the fixed wings and undercarriage.

Normal shocks of landing are taken by the resilient wheel 11, and additional shock absorption is provided, in the preferred form of the invention, by means of the construction shown in detail in Figs. 3 and 4. As before said, the spindle 12, of each wheel, is pivotally mounted on the rigid strut 13, and to this end, the strut is provided with forks 13a to receive the spindle and the pivot pin 14, the inner end or extension, 12a, of the spindle being flexibly connected to the strut 13 by any suitable shock absorber, such as the rubber shock absorber cord 21, suitable retaining flanges 22, 23, 23 being provided to prevent displacement of the shock absorber cord.

In order properly to position the spindle 12, when in flight, and to take the rebound or reaction of shock absorption, there may be provided a suitable rubber stop device 24 mounted between the strut 13 and the inner end or extension 12a of the spindle.

From the foregoing, it will be evident that we have devised a landing gear which attains the desired objects in a simple and effective manner, compression strains being carried inwardly and upwardly to the fuselage through the fixed wings, tension strains in landing being taken by the wires extending to a lower part of the fuselage, and tension strains in supporting the landing gear while in flight being taken by the wires between the landing gear and the fixed wing. By making use of the fixed wings and the peculiar co-operative relation between them and the fuselage, an unusually wide undercarriage has been provided, while at the same time we have made possible the elimination of a considerable number of guy wires, or other wing supporting means or braces. It will also be seen that side slip strains are taken care of in the simplest possible manner, being carried substantially directly to the fuselage itself, and that only a very lightweight structure need be provided for the support of the undercarriage in flight.

What we claim is:

1. In an aircraft, an undercarriage including wheel means widely spaced apart transversely of the craft, compression means extending upwardly and inwardly therefrom to the body of the craft at an angle such that side strains, in landing, are carried substantially directly lengthwise through the compression means, and tension means extending from the wheel means to the aircraft below the compression means, said wheel means comprising resilient wheel members to take landing shocks, together with supplemental shock-absorption means including a support for each wheel member and a shock absorber between said support and said compression means.

2. In an aircraft, an undercarriage including wheel means widely spaced apart transversely of the craft, compression means extending upwardly and inwardly therefrom to the body of the craft at an angle such that side strains, in landing, are carried substantially directly lengthwise through the compression means, and tension means extending from the wheel means to the aircraft below the compression means, said wheel means comprising resilient wheel members to take landing shocks, together with supplemental shock-absorption means including a support for each wheel member pivotally mounted on the compression means and a shock-absorber between the support and the compression means.

3. In an aircraft, an undercarriage including wheel means widely spaced apart transversely of the craft, compression means extending upwardly and inwardly therefrom to the body of the craft at an angle such that side strains, in landing, are carried substantially directly lengthwise through the compression means, and tension means extending from the wheel means to the aircraft below the compression means, said wheel means comprising resilient wheel members to take landing shocks, together with supplemental shock-absorption means including a support for each wheel member pivotally mounted on the compression means, a shock-absorber between the support and the compression means, and resilient means for positioning the pivoted support with relation to the compression means.

4. In combination with an aircraft having a body, a freely-rotative sustaining unit thereabove, and supplemental fixed wings extending laterally of the body, an undercarriage, and a common compression means interbracing the fixed wings and body and taking landing strains from the undercarriage to the body through the fixed wings, and tension means acting to support the undercarriage weight, in flight, from the fixed wings.

5. In combination with an aircraft having a body, a freely-rotative sustaining unit thereabove, and supplemental fixed wings extending laterally of the body, an undercarriage, and a common compression means interbracing the fixed wings and body and taking landing strains from the undercarriage to the body through the fixed wings, and tension means acting to support the undercarriage weight, in flight, from the fixed wings, together with tension means extending from the body to the undercarriage and positioned below said compression means.

6. An aircraft having a fuselage, freely-rotative sustaining means thereabove, a pylon supporting the latter from the fuselage, alighting mechanism, and compression means extending from said mechanism to the fuselage adjacent said pylon.

7. An aircraft having a fuselage, freely-rotative sustaining means thereabove, a pylon supporting the latter from the fuselage, alighting mechanism, and compression means extending from said mechanism to the fuselage adjacent said pylon, together with tension means extending from said mechanism to a lower part of the fuselage.

8. An aircraft having a fuselage, freely-rotative sustaining means thereabove, a pylon supporting the latter from the fuselage, alighting mechanism, and compression means extending from said mechanism to the fuselage, said pylon and compression means being connected adjacent one another to a fuselage element.

9. An aircraft having a fuselage, freely-rotative sustaining means thereabove, a pylon supporting the latter from the fuselage, alighting mechanism, and compression means extending from said mechanism to the fuselage, said pylon and compression means being connected adjacent one another to an upper fuselage longeron.

10. An aircraft having a fuselage, freely-rotative sustaining means thereabove, a pylon supporting the latter from the fuselage, alighting mechanism, and compression means extending from said mechanism to the fuselage, said pylon and compression means being connected adjacent one another to an upper fuselage longeron, together with tension means connected to said mechanism and a lower fuselage longeron.

11. An aircraft having a fuselage, freely-rotative sustaining means thereabove, a pylon supporting the latter from the fuselage, alighting mechanism, and compression means extending from said mechanism to the fuselage adjacent said pylon, together with supplemental fixed wings connected to said fuselage below said pylon and braced by said compression means.

12. An aircraft having a fuselage, freely-rotative sustaining means thereabove, a pylon supporting the latter from the fuselage, alighting mechanism, and compression means extending from said mechanism to the fuselage adjacent said pylon, together with tension means extending from said mechanism to a lower part of the fuselage and supplemental fixed wings connected to the fuselage adjacent the connection of the tension means and braced by said compression means.

13. In an aircraft, a fuselage, a freely-rotative sustaining unit mounted thereabove, and fixed wings and alighting gear compression members extending outwardly from said fuselage and with their longitudinal axes substantially crossing one another and said parts being interconnected at points spaced laterally outwardly of the fuselage, said compression members being connected to the fuselage at the region of mounting of said rotative sustaining means, and said fixed wings being secured to the fuselage adjacent the bottom thereof.

14. In an aircraft, a fuselage, a freely-rotative sustaining unit mounted thereabove, and fixed wings and landing gear compression members extending outwardly from said fuselage and with their longitudinal axes substantially crossing one another at points spaced laterally outwardly of the fuselage, together with landing gear tension members below said fixed wings and connected thereto.

15. In combination with an aircraft having a body, a freely-rotative sustaining unit thereabove, and supplemental fixed wings extending laterally of the body, an undercarriage, and a common compression means interbracing the fixed wings and body and taking landing strains from the undercarriage to the body through the fixed wings, and means connected to the fixed wings, outwardly of the body, and serving to carry weight of the undercarriage, in flight.

16. In combination with an aircraft having a body, a freely-rotative sustaining unit thereabove, and supplemental fixed wings extending laterally of the body, an undercarriage, and a common compression means interbracing the fixed wings and body and taking landing strains from the undercarriage to the body through the fixed wings, means connected to the fixed wings, outwardly of the body, and serving to carry weight of the undercarriage, in flight, and means positioned below said compression means and serving to interbrace said undercarriage and said body.

17. An aircraft having a fuselage, freely-rotative sustaining means thereabove, a pylon supporting the latter from the fuselage, supplemental fixed wings extending laterally of the fuselage, alighting mechanism, and compression means extending from said mechanism to said fixed wings and from said fixed wings to the fuselage adjacent said pylon.

18. An aircraft having a fuselage, freely-rotative sustaining means thereabove, a pylon supporting the latter from the fuselage, supplemental fixed wings extending laterally of the fuselage, alighting mechanism, bracing means interconnecting said mechanism and said fixed wings, and bracing means extending upwardly and inwardly from said fixed wings to said pylon.

19. An aircraft having a fuselage, freely-rotative sustaining means thereabove, a pylon supporting the latter from the fuselage, supplemental fixed wings extending laterally of the fuselage, alighting mechanism, bracing means interconnecting said mechanism and said fixed wings, bracing means extending upwardly and inwardly from said fixed wings to said pylon, and bracing means extending from said alighting mechanism to said fuselage.

In testimony whereof we have hereunto signed our names.

HAROLD F. PITCAIRN.
JUAN DE LA CIERVA.